United States Patent [19]
Kline et al.

[11] Patent Number: 5,479,077
[45] Date of Patent: Dec. 26, 1995

[54] WINDOW WIPER SYSTEM FOR INFRARED CAMERA

[75] Inventors: David Kline, Cerritos; Paul R. Salvio, Palos Verdes Estates; David M. Masarik, Laguna Beach, all of Calif.

[73] Assignee: Hughes Aircraft Company, Los Angeles, Calif.

[21] Appl. No.: 263,272

[22] Filed: Jun. 21, 1994

[51] Int. Cl.6 .................................................. A47L 1/02
[52] U.S. Cl. ................................... 318/443; 318/DIG. 2; 15/250.31
[58] Field of Search ...................... 318/443, 444, 318/DIG. 2; 15/250.001, 250.2, 250.31, 250.32, 250.33, 250.34, 250.35

[56] References Cited

U.S. PATENT DOCUMENTS

| | | |
|---|---|---|
| 3,634,902 | 1/1972 | Smithers et al. . |
| 3,660,862 | 5/1972 | Scinta . |
| 3,832,750 | 9/1974 | Jarvinen et al. . |
| 3,837,036 | 9/1974 | Burger et al. . |
| 3,879,793 | 4/1975 | Schlegel . |
| 4,007,511 | 2/1977 | Deibel . |
| 5,157,551 | 10/1992 | Spence . |
| 5,320,333 | 6/1994 | Koch . |

OTHER PUBLICATIONS

"The Eveningstar", Washington, D.C., Jul. 25, 1972 p. A-12.

*Primary Examiner*—Bentsu Ro
*Attorney, Agent, or Firm*—M. W. Sales; W. K. Denson-Low

[57] ABSTRACT

A miniaturized window wiper includes a mounting hub having a concealed mounting boss therein, the hub being pivotally connected to a wiper arm which further mounts and shrouds a wiper blade holder, the wiper arm being subjected to tension by a torsion spring in order to bias a wiper blade against a window. A motor drive system for imparting oscillating motion to the wiper is also disclosed.

16 Claims, 2 Drawing Sheets

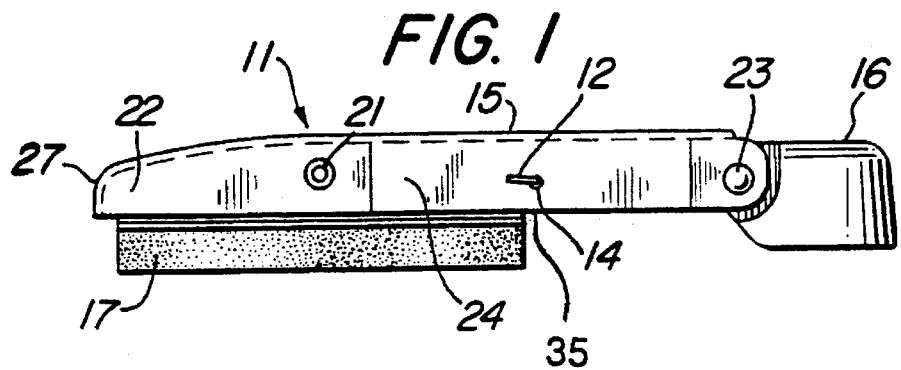
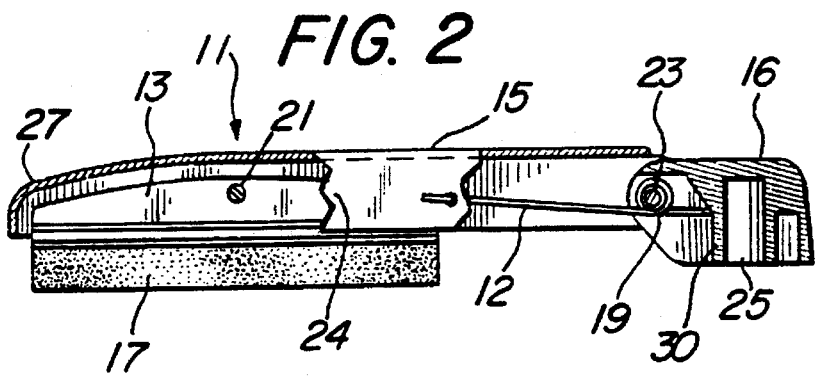
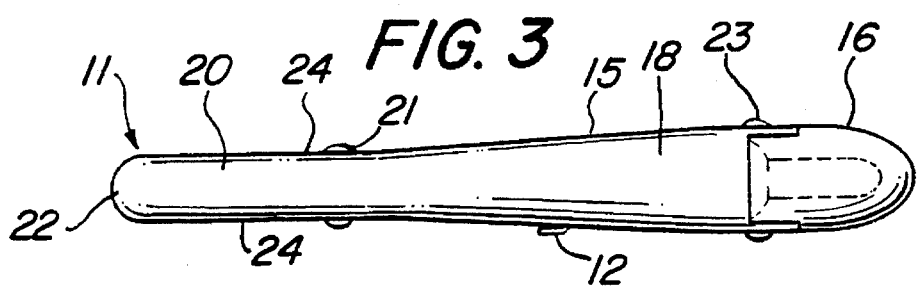
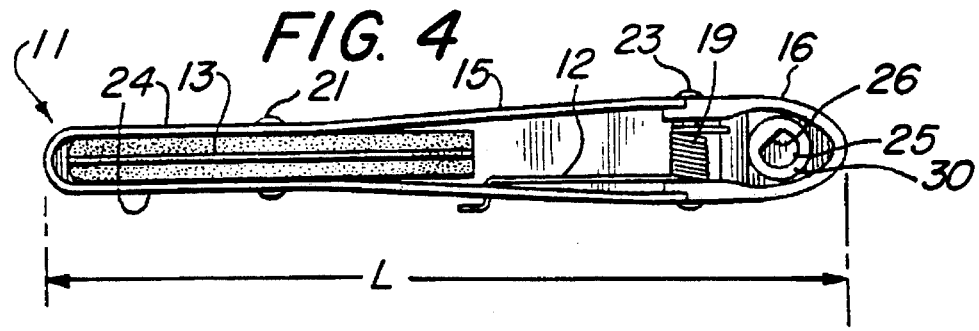

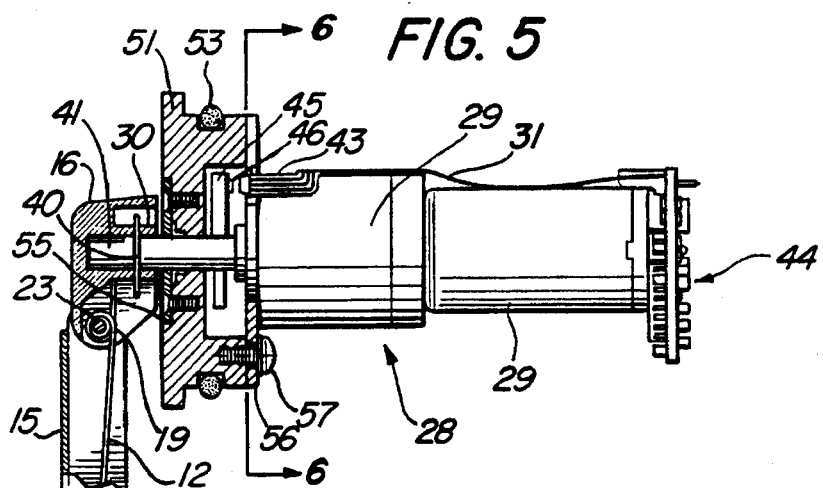
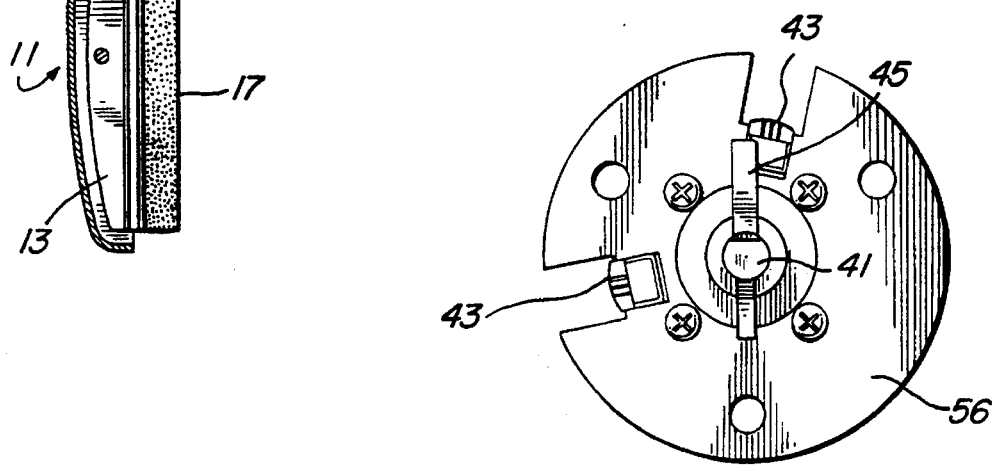
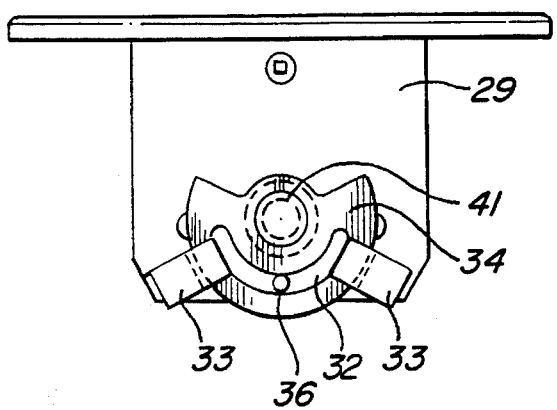

5,479,077

WINDOW WIPER SYSTEM FOR INFRARED CAMERA

BACKGROUND OF THE INVENTION

1. Field of the Invention

The subject invention relates generally to infrared cameras having a window therein and, more particularly, to a window wiper system for such cameras.

2. Description of Related Art

Thermal vision systems capable of producing real time video pictures in total darkness have recently been introduced for civilian use, most particularly for law enforcement agencies. Such systems work much like the forward-looking infrared technology used by the U.S. military. Current Night Vision System designs depend on clear infrared vision through an edge-heated sensor window mounted flush with a housing. To date, no device has been provided to continuously control the surface quality of such a detector window. Conventional "window wiper" designs are large and heavy and controlled by complex mechanical means, and are unsuitable for the compact environment of a Night Vision infrared sensor.

OBJECTS AND SUMMARY OF THE INVENTION

It is therefore an object of the invention to provide an improved window wiper;

It is a further object of the invention to provide a miniaturized window wiper, as well as a compact system for actuating same;

It is another object of the invention to provide a device for cleaning and clearing the sensor window of a Night Vision infrared imaging device;

It is another object to provide such a device which is compact, lightweight, has a low part count, and is easily manufactured.

It is still another object to provide such a device which eliminates mechanical parts.

According to the invention, a streamlined, small scale window wiper is provided which is ideally suited to remove foreign particles from an infrared detector window, and thus maintain image quality during adverse environmental conditions. The wiper includes a wiper hub, wiper arm, wiper blade holder and torsion spring means. Means for controlling the window wiper oscillating motion across the thermal imaging window is also provided. In one embodiment, such control is achieved through the incorporation of a suitable motor, Hall effect sensors, and an activating magnet. In a second embodiment, such control is achieved through the incorporation of a motor, LED sensors, and a solid disk interrupt.

One advantage of the preferred embodiment is the incorporation of a torsional spring means rather than an extension type to control the wiper force against the window surface. This feature particularly minimizes space in the relatively miniature confines of typical night vision windows. Wipers according to the preferred embodiment are fabricated according to a lightweight non-metallic construction, a further advantage in the particular environment of night vision systems for non-military use.

BRIEF DESCRIPTION OF THE DRAWINGS

The just-summarized invention will now be described in connection with the drawings of which:

FIG. 1 is a side elevational view of a window wiper according to the preferred embodiment;

FIG. 2 is a partially broken away side view of the window wiper of FIG. 1;

FIG. 3 is a top view of the window wiper of FIG. 1;

FIG. 4 is a bottom view of the window wiper of FIG. 1;

FIG. 5 is a side sectional view of the window wiper of FIG. 1 and a motor assembly for driving it;

FIG. 6 is a sectional view taken at 6—6 of FIG. 5; and

FIG. 7 is a front view illustrating alternate apparatus for imparting oscillatory motion to the preferred window wiper.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a particularly useful and readily manufacturable window wiper and window wiper system.

The preferred window wiper 11 is illustrated in FIGS. 1–5. This window wiper 11 includes a wiper hub 16 pivotally mounted by a first wiper pin 23 to a wiper arm 15. The wiper arm 15 is, in turn, pivotally mounted by a second wiper pin 21 to a wiper blade holder 13. The wiper blade holder 13 mounts the wiper blade 17, for example, in slidably inserted fashion. The respective first and second wiper pins 21, 23 may be held in position by fasteners at either end thereof, for example, such as rivets or so-called "E-clips."

As shown in FIG. 2, the hub 16 includes a concealed boss 30 containing a central bore 25 for attachment to the drive shaft of a motor, e.g., 29 (FIG. 5). The bore 25 is generally cylindrical in cross-section with the exception of a flat face 26 which provides for positive interlocking with a motor drive shaft.

A torsion spring 19 is located on the wiper pin 23 in order to provide a downward force on the wiper arm 15, biasing the wiper arm 15 toward the window. A first extended arm 12 of the spring 19 is shaped to interlock with an aperture 14 in the side of the wiper arm 15.

The wiper arm 15 is shaped to provide a shroud over the wiper blade holder 13 and the torsion spring 19, thereby contributing to an aesthetic overall appearance. Thus, as seen in the top view of FIG. 3, the shroud contains a first rear portion 18 whose sides sweep symmetrically over half its length into an elongated front portion 20 terminating in a rounded nose 22. In the side view of FIG. 1, the wiper arm 15 exhibits a depending side skirt 24 terminating in a linear edge 35, as well as a downward slope 27 to the nose 22.

In one exemplary embodiment, the wiper hub 16, wiper arm 15, and wiper blade holder 13 are made of high-impact polystyrene. The torsion spring 19 supplies a downward force on the wiper blade 17 of approximately 3.2 oz. Dimension L in FIG. 4 is approximately L=3.939 inches.

FIGS. 5 and 6 illustrate a wiper motor assembly employing magnetic means to control the oscillation of the wiper 11 of FIGS. 1–4. In FIGS. 5 and 6, a motor 29 is mounted in conjunction with a cooperating housing by means of a motor bracket 51 and 0-ring seal 53. A circular retainer seal 55 is fitted over the motor shaft 41 and screwed or otherwise fastened into position on the motor bracket 51. A switch plate 56 carrying first and second Hall effect sensors 43 is attached to the face of the motor 29, again by suitable screws or other fastening means. The motor bracket 51 is then attached to the switch plate 56 by a screw or similar fastener 57. The hub 16 of the wiper 11 may be attached to the motor shaft 41 by any conventional means such as set screws, splines, screw-type or retaining rings or clips. A retaining ring 40 is shown in use in FIG. 5.

In the embodiment of FIGS. 5 and 6, the motor 29 is controlled by the first and second Hall effect sensors 43. A magnetic activator or magnetic pin 45 has a magnetic element 46 (FIG. 5) attached thereto and is positioned to rotate with the motor shaft 41 and thereby actuate the sensors 43.

The sensors 43 may be part No. 4140U as available from Allegro and connected by a suitable flex cable 31 to cooperating switching electronics 44 which accomplish directional switching. Electronics 44 for reversing the direction of motor 29 in response to switching signals from elements such as sensors 43 is well known in the art, per se.

Thus, in operation of the embodiment of FIGS. 5 and 6, the range of oscillatory motion is governed by the Hall effect sensor-magnetic activator interaction. The motor 29 initiates motion of both the wiper 11 and the magnetic activator 45. As the magnetic activator 45 approaches the Hall effect sensor 43 on one side of the motor 29 and subsequently activates it, the direction of rotation of the shaft 41 is reversed, and the process is again repeated ad infinitum. Two governor pins (not shown) may also preferably be provided, spaced 120° apart. Such pins may serve as physical stops for the magnetic pin in order to physically stop wiper movement should the magnetic means fail.

An alternate embodiment employing optical means to control oscillation of the wiper 11 is illustrated in FIG. 7. In particular, slotted optical switches 33 are provided on either side of the motor 29. As shown in FIG. 6, these switches 33 may be positioned at equal angles from the vertical, i.e., symmetrically disposed on either side of the motor 29. The switches may be LED sensor switches part No. OPB848Tx as available from OPTEK. A solid disk interrupt 34 having a circular slot 32 therein is fixedly attached to and moves with the motor shaft 41.

In the embodiment of FIG. 7, the range of oscillatory motion of the wiper 11 attached to the drive shaft 41 is governed by the interaction of the LED sensor switches 33 and the solid disk interrupt 34. The motor 29 initiates both the motion of the wiper 11 and the solid disk 34. Throughout the permitted range of motion, the LED sensor 33 is prevented from "seeing itself." As a result of the solid disk interrupt, when the limit of motion is reached, a sensor 33 does see itself, causing generation of a switching signal and reversal of the direction of the rotation of the motor shaft 41. This reversal is again repeated ad infinitum. In the embodiment of FIG. 7, a governor pin 36 is provided to physically limit the range of motion of the wiper blade 11 in the event of failure of the optical motion limiting means.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A window wiper for the window of an infrared camera comprising:

a wiper hub;

a wiper arm pivotally mounted to said hub, said wiper arm including a unitarily formed member having atop surface sweeping inwardly over half its length into an elongated front portion terminating in a rounded nose and having respective side skirts depending from said top surface, said side skirts each terminating in a linear edge;

a wiper blade holder pivotally mounted to said wiper arm;

a wiper blade mounted by said holder; and torsion spring means applying downward force on said wiper arm to press said blade against said window.

2. The system of claim 1 wherein said wiper arm comprises shroud means for covering both said wiper blade holder and said spring means.

3. The system of claim 1 wherein said hub contains a concealed boss means for attachment to a motor shaft.

4. The system of claim 3 wherein said wiper arm has an aperture therein and wherein said torsion spring means has an extended arm interlocking with said aperture.

5. A window wiper system for the window of an infrared camera comprising:

a wiper hub;

a wiper arm pivotally mounted to said hub, said wiper arm including a unitarily formed member having a top surface sweeping inwardly over half its length into an elongated front portion terminating in a rounded nose and having respective side skirts depending from said top surface, said side skirts each terminating in a linear edge;

a wiper blade holder pivotally mounted to said wiper arm;

a wiper blade mounted by said holder;

torsion spring means applying downward force on said wiper arm; and means connected to said wiper hub for moving said wiper arm blade in an oscillatory motion across said window.

6. The system of claim 5 wherein said means for moving comprises:

a motor having a drive shaft; and optical means for sensing the position of said drive shaft and controlling said drive shaft to provide said oscillatory motion.

7. The system of claim 5 wherein said means for moving comprises:

a motor having a drive shaft; and magnetic means for sensing the position of said drive shaft to provide said oscillatory motion.

8. The system of claim 7 wherein said magnetic means comprises first and second Hall effect sensors disposed about said drive shaft and a magnetic activator fixedly mounted to said drive shaft.

9. The system of claim 5 wherein said wiper arm comprises shroud means for covering said wiper blade holder and torsion spring means.

10. The system of claim 9 wherein said hub contains concealed boss means for attachment to a motor shaft.

11. The system of claim 10 wherein said wiper arm has an aperture therein and wherein said torsion spring means has an extended arm interlocking with said aperture.

12. The system of claim 5 wherein said wiper hub, wiper blade holder and wiper arm are each fabricated of a high impact plastic.

13. The system of claim 12 wherein said wiper hub and wiper arm are positioned adjacent one another and have a combined length of less than four inches.

14. A window wiper comprising:

a wiper hub having a boss means for attachment to a drive shaft located therein and concealed thereby;

a wiper arm pivotally mounted to said hub;

a wiper blade holder pivotally mounted to said wiper arm;

a wiper blade mounted by said holder; and torsion spring means applying downward force on said wiper arm to press said blade against a window; and wherein said wiper arm comprises a unitary member having respective top surface sides which sweep inwardly over half the length of said top surface into an elongated front portion terminating in a rounded nose, said member further having respective side skirts depending from said top surface, said side skirts terminating in a linear edge and being of a length selected to cover at least a portion of both said holder and said torsion spring means.

15. The window wiper of claim 14 wherein said wiper arm, wiper blade holder and wiper hub are each fabricated from a high impact plastic.

16. The system of claim 15 wherein said wiper hub and wiper arm are positioned adjacent one another and have a combined length of less than four inches.

\* \* \* \* \*